United States Patent [19]

Jung

[11] Patent Number: 4,758,960

[45] Date of Patent: Jul. 19, 1988

[54] METHOD OF CUTTING OUT FAULTLESS PATTERN PIECES

[75] Inventor: Rolf Jung, Waiblingen, Fed. Rep. of Germany

[73] Assignee: Krauss und Reichert GmbH & Co. KG Spezialmaschinenfabrik, Fellbach, Fed. Rep. of Germany

[21] Appl. No.: 869,011

[22] Filed: May 30, 1986

[51] Int. Cl.[4] .......................... G06F 15/46; B26D 5/30

[52] U.S. Cl. .......................................... 364/470; 83/71; 83/925 CC; 250/572; 358/106; 356/238; 364/475; 364/507

[58] Field of Search ........................ 364/470, 475, 507; 83/71, 74, 520–522, 925 CC; 356/238; 358/106, 101, 107; 250/571, 572

[56] References Cited

U.S. PATENT DOCUMENTS

| | | | |
|---|---|---|---|
| 3,540,830 | 11/1970 | DiCanio | 356/238 |
| 3,803,960 | 4/1974 | Pearl et al. | 83/56 |
| 3,887,903 | 6/1975 | Martell | 364/900 |
| 4,176,566 | 12/1979 | Patterson et al. | 83/925 CC |
| 4,381,859 | 5/1983 | Jung et al. | 270/31 |
| 4,575,065 | 4/1986 | Jung et al. | 270/31 |
| 4,583,181 | 4/1986 | Gerber et al. | 364/470 |

*Primary Examiner*—Joseph Ruggiero

*Attorney, Agent, or Firm*—Spencer & Frank

[57] ABSTRACT

The invention relates to a method for cutting out faultless pattern pieces from webs of fabric superimposed to form a stack and having irregularly occurring material defects. According to the invention, intrusive material defects are cut out and the individual parts of each web of fabric which has had a material defect cut out of it are overlapped such that a complete set of pattern pieces is obtained each time and none of these pieces contains an intrusive material fault. The coordinate data for the material defect are ascertained by digitally operating means and stored in digital form so that the can be displayed, together with cutting data, on a screen which is preferably displaced together with a fabric laying carriage of a fabric laying machine for carrying out the inventive method.

12 Claims, 5 Drawing Sheets

METHOD OF CUTTING OUT FAULTLESS PATTERN PIECES

The invention relates to a method of cutting out faultless pattern pieces from webs of fabric superimposed to form a stack and having irregularly occurring material defects.

The fundamental problem occurring during production of pattern pieces in the clothing industry is that some of the pattern pieces are defective as the fabric webs used have faults in them, in particular weave faults, soiled spots, tears and the like. The following methods are already known for sorting out defective pattern pieces or rather for avoiding the use of defective pattern pieces when producing articles of clothing:

No watch is kept for defects while the fabric webs are being laid out and the pattern pieces cut. This means that faulty pattern pieces also result automatically. These are not detected until the next step in production, namely when articles of clothing are sewn together from the pattern pieces by a sewing machine operator. There is then the risk that the sewing machine operator who generally does piecework will occasionally overlook faulty pattern pieces completely or see them too late to interrupt the work. Some articles of clothing will therefore be produced with faults and have to be thrown away or sold at a considerably reduced price. If the sewing machine operator detects a faulty pattern piece in good time, this is sorted out. The designation and size of the relevant piece are noted in a list and new pattern pieces then cut out on the basis of this list This method is disadvantageous in that the production flow during sewing is constantly interrupted as a result of faulty pattern pieces and, if necessary, articles of clothing which are already partially finished must be taken out of production due to the lack of defect-free pattern pieces. Completion of these articles of clothing then has to wait until newly cut, faultless pattern pieces can be supplied. In addition, the subsequent cutting of pattern pieces is time-consuming and uneconomic. Finally, it is a nuisance and uneconomic to have unfinished articles of clothing lying around the working areas of the sewing machine operators; these articles of clothing cannot be finished until defect-free pattern pieces are supplied. Moreover, there is the risk with this mode of operation that the subsequently produced, faultless pattern pieces are from a piece of material, the color and/or structure of which differ from the qualities of the adjacent pattern pieces in the finished article of clothing due to variations in production conditions during the manufacture of the webs of fabric.

In another known method, an attempt is made to detect material defects prior to cutting and to cut out the faulty parts of the material. This mode of operation has the following possibilities:

A watch is kept for defects at an inspection machine and the faulty places marked at the edge of the web of fabric, for example by a piece of thread. When the web of fabric is being laid out by a laying machine, the machine will be stopped by the operating personnel as soon as a fault is detected. The web of cloth is then cut off across its entire width and transversely to the laying direction, The new beginning of the fabric web resulting therefrom is relaid at one of several possible overlapping points, which are ascertained beforehand and the position of which is marked on the table by suitable marking means, and the interrupted laying process is continued. In this way, the finished stack of superimposed webs of fabric includes several layers which consist of two or more overlapping web portions.

This method is disadvantageous in that the web of fabric is cut off and the web portions overlapped in accordance with a predetermined schema for each defect regardless of the place in the marker, at which the defect is found. The web of fabric is cut off and overlapped even when the detected fault would have been located in a waste piece or in an area of a pattern piece which would not be visible in the finished article of clothing, for example at a seam or on the reverse side of a collar etc. Consequently, this results in an unnecessarily high requirement for material and a corresponding increase in the cost of producing the articles of clothing. In addition, the risk remains, as in the first mode of operation described above in which no watch is kept for defects, that pattern pieces containing defects are not detected when sewing the articles of clothing or too late. When the web portions are overlapped not only defect-free pattern pieces are obtained from the newly joined web portion but also, according to the position of the material defect, one or more faulty pattern pieces from the first laid out portion of the web of fabric.

To avoid any unnecessary cutting out of defects it has also been known to place a transparent marker on the stack of cloth webs, after a material defect has been detected, to establish whether the defect is in the reject material or in a pattern piece. This method is, however, extremely time-consuming and presupposes very thorough working on the part of operating personnel. The marker must be placed exactly in the right position on the uppermost cloth layer and the type and extent of the material defect have to be taken into careful consideration if it is to be guaranteed that faultless pattern pieces are indeed obtained when the web of fabric is not cut and overlapped. Similar problems arise when the material defect is not detected until the webs of fabric are laid out on a spreading table or the like.

A certain improvement is achieved in productivity, and the burden on operating personnel lessened at the same time, when means are provided at the spreading table or, if necessary, at the inspection machine which allow the coordinates of a defect to be determined in digital form in relation to the beginning and to a longitudinal edge of the fabric web. In this case, the coordinates of the material defect can be compared with the digitally memorized coordinate data of the marker and a computer can be used to assist in establishing whether a defect occurs in a pattern piece or in the reject material. It is advantageous for the marker or the part thereof which is of interest to be displayed on a screen, if possible enlarged, and for the position of the defect to be indicated at the same time on the screen. The operating personnel can then decide more easily, on the basis of the optical display, whether or not it is necessary to cut and overlap. In principle, this decision may be made automatically. However, if it is left to the operating personnel to decide, this has the advantage that, in certain circumstances, an overlapping can be dispensed with if the material defect is located in an area of the pattern piece which is not or only slightly relevant for the finished article of clothing. Operation with such a screen display is described, for example, in German laid-open paper DE-OS No. 27 31 741. According to this publication, the webs of cloth are examined for material defects at the spreading table and the monitor displaying the marker and the position of the defect in this marker is connected to the laying apparatus displaceable along the spreading table, The cited publication proposes that the last web of cloth laid, in which the material defect is found, should be displaced, rotated or turned such that the material defect is no longer located in a pattern piece. The proposed manipulations for altering the position of the web of fabric are, however, impracticable for economic production. In view of the customary size of individual fabric layers which are, for example, about 6 m long and 3 m wide, a number of people would have to work together to alter the position of the web in relation to the part of the stack already laid. This entails a high risk of the web being spread out inaccurately such that the pattern pieces at the edge of the web cannot be completely cut out. Moreover, folds may occur in the web of fabric when it is laid out and these folds lead to errors in the dimensions of the finished pattern pieces. The web of fabric may also be stretched too much in comparison with the webs of fabric spread out normally and this also leads to problems with the finished article of clothing.

German laid-open paper DE-OS No. 33 47 732, which is based on U.S. patent application Ser. No. 509,972 of June 30, 1983 abandoned, also proposes that, after detection of a material defect, the position of this defect in the marker be determined with the aid of computer and display means and the pattern piece affected by the defect be established. According to the known method, it is then established how large an additional piece of cloth or patch must be to be able to produce a relevant defect-free pattern piece. A patch of the desired size is then spread out in the correct position over the defective part of the last web of cloth to be laid out. The patch is normally cut from material remnants or from a supply of material provided for this purpose. It is also possible to patch the defect by cutting the web of fabric or folding the same, the new layer being laid out with a corresponding overlap.

The disadvantage of this known method is the fact that, apart from the faultless pattern piece which is produced from the patch, a faulty pattern piece is always produced from the cloth layer originally laid out and so the risk is again entailed, when sewing an article of clothing from the pattern pieces produced in this way, that a defective pattern piece is inadvertently used. Moreover, there is also the risk in the known method that the color and/or material of the pattern piece provided for the patch will differ from the adjacent pattern pieces of the finished article of clothing. This is a serious problem because, as any person skilled in the art knows, endeavours must always be made to cut those pattern pieces which are later to be sewn immediately adjacent one another in an article of clothing from web portions which are as near to one another as possible in view of the unavoidable fluctuations in production conditions which occur during the manufacture of fabrics in the textile industry.

Proceeding on the basis of the state of the art and the problems discussed above which result from the known methods, the object underlying the invention is to provide an improved method for cutting out faultless pattern pieces. A first aim of the invention is to keep the material requirements altogether as low as possible. A second aim of the invention is to provide pattern pieces which are as similar as possible to their adjacent pattern pieces in a finished article of clothing, with regard to their color and other material properties.

A further aim of the invention is to avoid any pattern pieces being cut out, along with the faultless pattern pieces, which contain a fault detected during examination of the fabric to be processed.

Finally, all these aims are intended to be realized in a manner which makes the work of the operating personnel altogether easier so that the laying out and cutting out of webs of fabric can be performed quickly and economically.

The object underlying the invention is accomplished in a method of the type described at the outset by a combination of the following method steps:

A marker is prepared from all the patterns for the pieces to be cut and the pattern pieces are arranged relative to one another in the manner in which they are to be cut out of the superimposed webs of fabric;

the data of the complete marker are stored in digital form in data memory means;

the webs of fabric are examined for material defects at the latest when the webs are laid out on the stack comprising a plurality of fabric webs on a carrier;

as soon as a material defect has been detected in a web of fabric the coordinates of this web in the longitudinal direction thereof (X-direction), in particular in relation to the beginning of the fabric web, and transversely hereto (Y direction), in particular in relation to a longitudinal edge of the web of fabric, are fed to the data memory means as digital coordinate values;

when the webs of fabric are being laid out the marker, at least the area thereof where a material defect has been detected, is displayed together with the position of the material defect on a data display unit of a computer system connected to the data memory means;

when the detected material defect is an intrusive defect resulting in a perceptible impairment of an article of clothing to be made from the pattern pieces, a strip of material including this intrusive material defect is cut out of the web of fabric about to be laid out over its entire width and along optimum cutting lines extending in the Y-direction, these cutting lines being determined under the control of the computer system;

and the web end resulting after the defective strip of material has been cut out of the fabric web is placed on and overlaps the piece of fabric web already laid out, under the control of the computer system, such that during the cutting out process following the layup of fabric webs a complete set of faultless pattern pieces is obtained from the web layer composed of two pieces and no pattern pieces have intrusive material defects.

It is an important advantage of the inventive method that the inclusion of any pattern pieces which contain an intrusive material defect amongst the pattern pieces obtained during cutting out is avoided with absolute certainty when a strip of material which includes the detected material defect is cut out in a direction transverse to the full width of the web of fabric. This makes the work of the sewing machine operators considerably easier when sewing articles of clothing from pattern pieces. The sewing machine operators can concentrate fully on their sewing work and must not check every pattern piece to see whether or not this contains an intrusive material defect. In conjunction with the present application, an intrusive material defect is to be understood as a defect or faulty area in a cut pattern piece which would be visible in the finished article of clothing. On the other hand, the presence of material defects in places which are not or not normally visible in the finished article of clothing, for example in the region of seams, on the inside of trouser turnups or the underside of collars etc., or the occurrence of faulty material areas are deliberately allowed when working with the inventive method in the interests of keeping material requirements as low as possible.

According to the invention, the decision as to whether or not a defect detected in the relevant pattern piece—perhaps in a plurality of adjacent pattern pieces—is to be classified as an intrusive material defect is made by the operating personnel on the basis of the screen display. The operating personnel must in this case know how the individual pattern pieces are to be processed and the parts of the article of clothing to be sewn, for which the pattern pieces are to be provided. An advantageous development of the invention also provides the possibility, when feeding marker data into the memory means, of storing additional information as to what areas of the individual pattern pieces are normally visible in the finished article of clothing. In this case it is possible for the display of the marker on the display unit to differentiate between those areas of the pattern pieces which are visible later in the finished article of clothing and those areas which are not normally visible therein. This means that even inexperienced operating personnel can easily decide whether or not an intrusive material defect will occur in the finished article of clothing in view of the position of the detected material defect.

The inventive method can be further improved in that a plurality of pairs of coordinates can be stored instead of a single pair of coordinates for the center of a detected material defect, for example the coordinates of two diagonally opposed corner points of a larger material defect. In addition, it is possible, when a material defect is established and corresponding data concerning the position and possibly the extent of the material defect are recorded, to classify the defect and record the corresponding data. Three typical categories of material defect are, for example, weaving faults, mechanical faults, such as tears, holes and the like, and soiling defects, such as for example oil spots. It is obvious for the person skilled in the art that the relevant categories can have differing effects on the finished articles of clothing, in particular when the finished articles of clothing are later subjected to further treatment, for example dyeing, shrinking, napping etc. Corresponding information concerning the additional treatment steps to be carried out subsequent to sewing can also be stored in order to modify the criteria for deciding between intrusive and non-intrusive material defects as a function of the category of the detected fault.

With regard to determining the optimum cutting lines extending in the Y-direction when a strip of material containing a material defect has to be cut out of the web of fabric, the inventive method offers a particularly high degree of flexibility since the position of the cutting line can be calculated for each individual case on the basis of the marker data already stored such that the extra material required by overlapping is kept to a minimum. This is a significant advantage in comparison with the previous methods used, in which the web of fabric could be cut at only a few predetermined cutting line positions.

A further important advantage of the inventive method is to be seen in the fact that the width of the overlapping regions can be optimized by means of the computer system as a function of the marker data stored therein. The width of the overlapping regions is therefore selected such that these are as narrow as possible and just adequate to obtain a complete set of defect-free pattern pieces. This also keeps material requirements as low as possible.

Additional details and advantages of the invention are explained in the following in greater detail in conjunction with the drawings, in which FIG. 1 is a perspective, schematic, partial side view of a fabric laying machine for carrying out the inventive method;

Figures 5A, 5B, 5C, 5D, 5E, 5F:
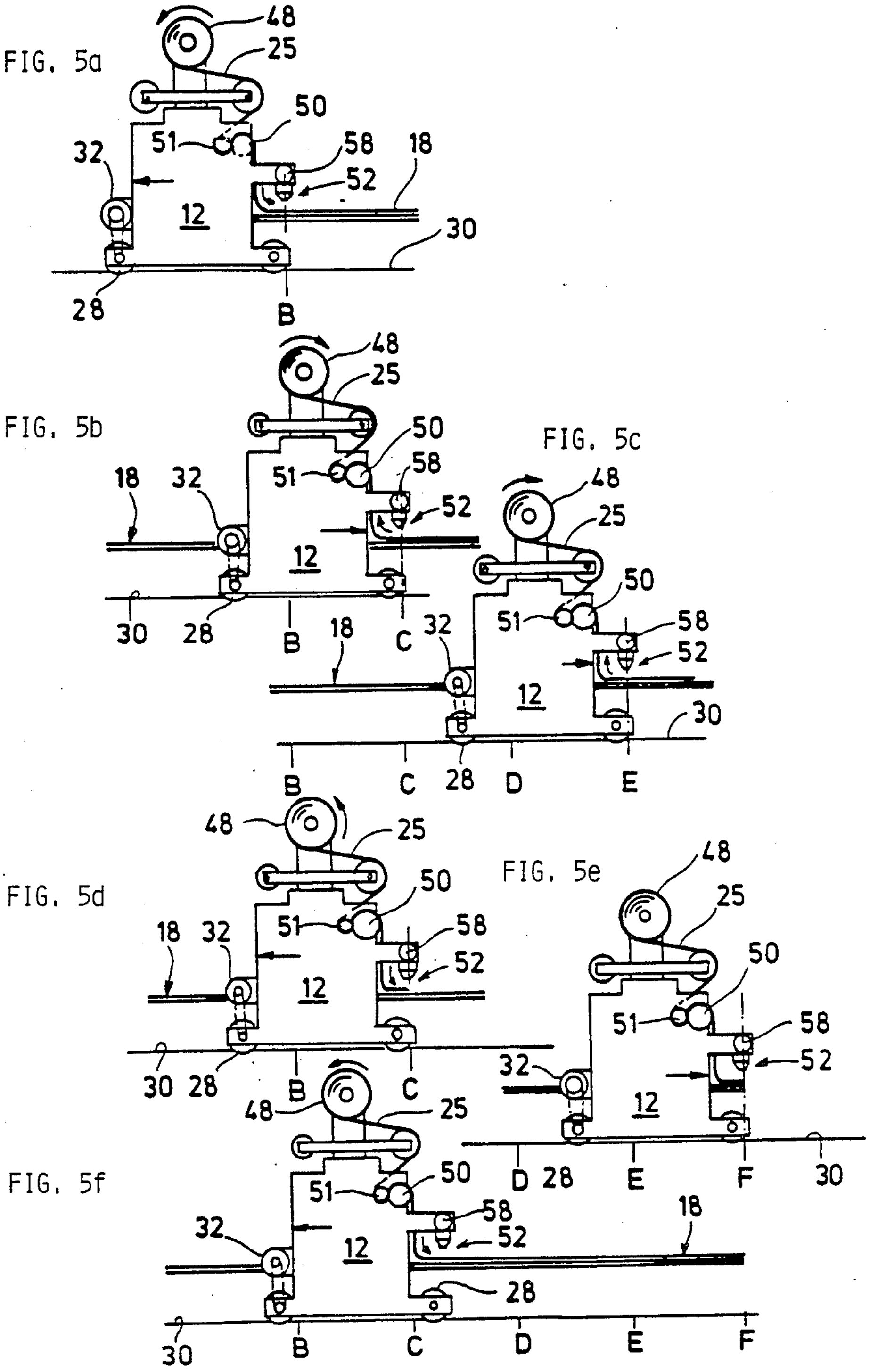
Figure 6:
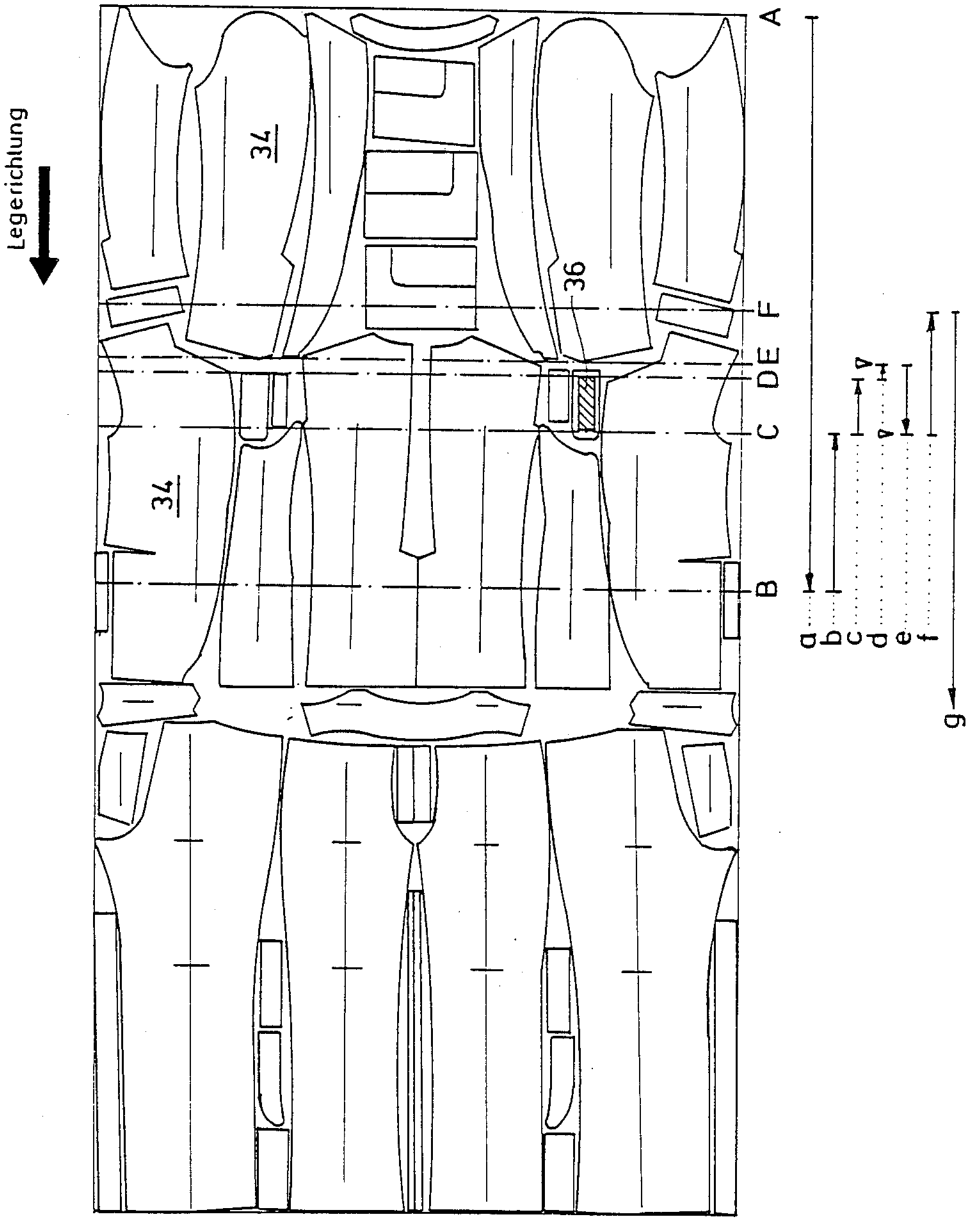

FIGS. 5*a* through 5*f* are a schematic illustrations showing the operating sequence of the inventive method when an intrusive material defect is detected during fabric laying, and FIG. 6 is a schematic plan view of a marker showing the position of an intrusive defect which is to be cut out and indicating the lines to be followed when carrying out the inventive method, the reduced-scale schematic illustration below the marker showing the distances to be travelled by a fabric laying carriage of the machine for carrying out the inventive method during cutting out of a material defect.

Figure 1:
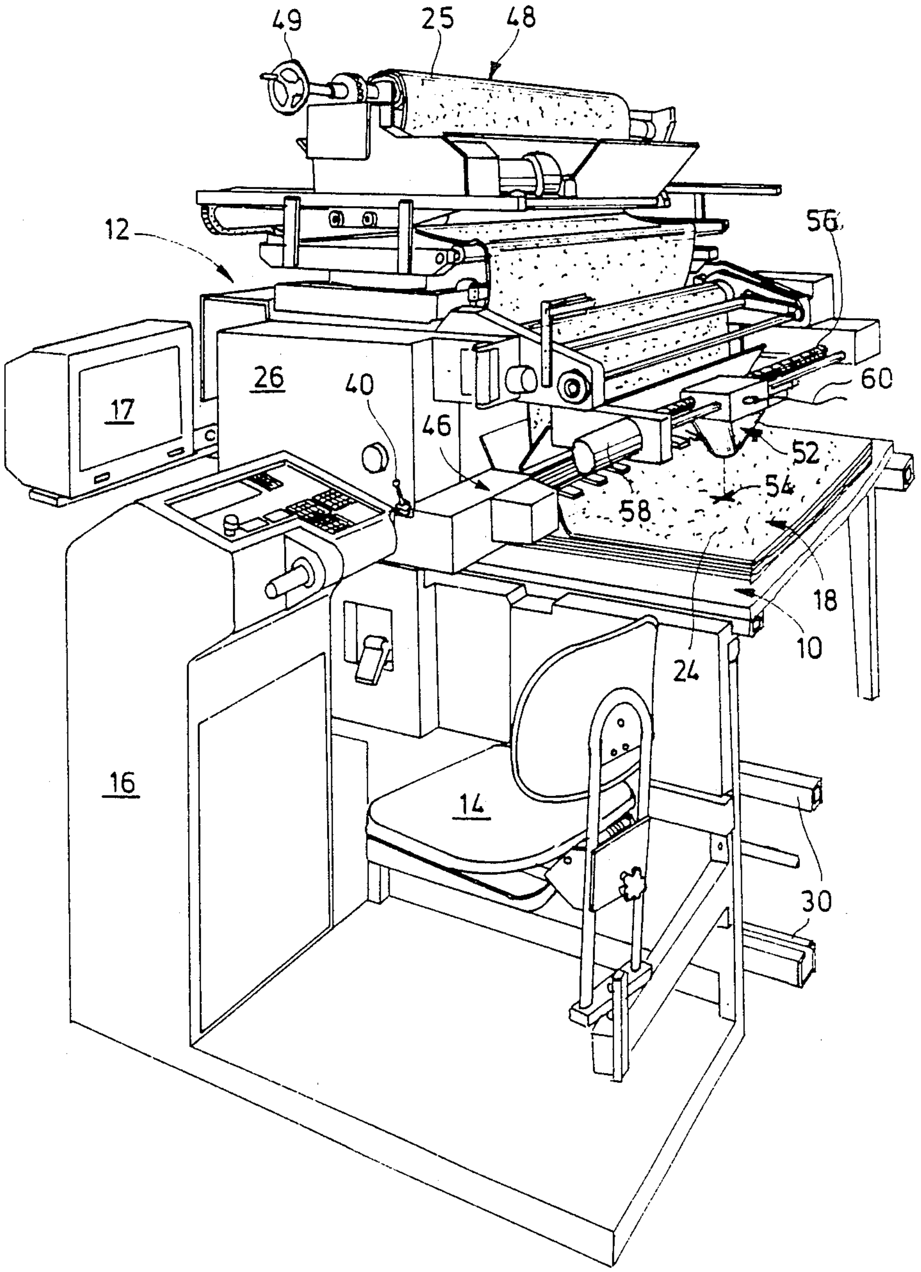

FIG. 1 shows in detail a fabric laying machine comprising a spreading table 10 and a fabric laying carriage 12; these elements 10, 12 of the fabric laying machine may be designed to a great extent in the conventional manner.

A platform, which comprises a seat 14 for operating personnel, a control console 16 and a monitor 17 and is displaceable together with the fabric laying carriage 12, is mounted on the fabric laying carriage 12 which is displaceable relative to the table 10.

Figure 2:
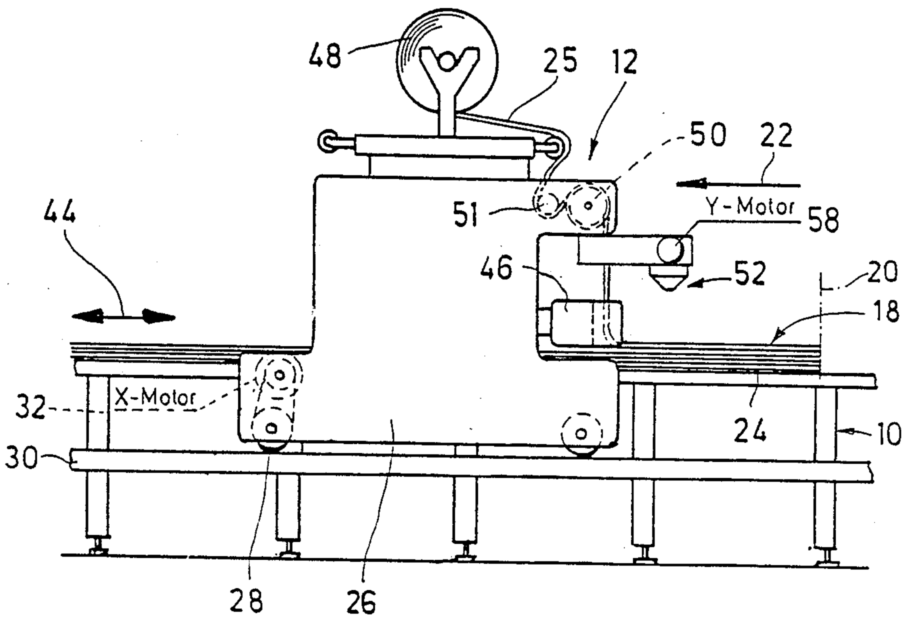
FIG. 2 is a side view of the machine according to FIG. 1 but without the operator's unit.
Figure 3:
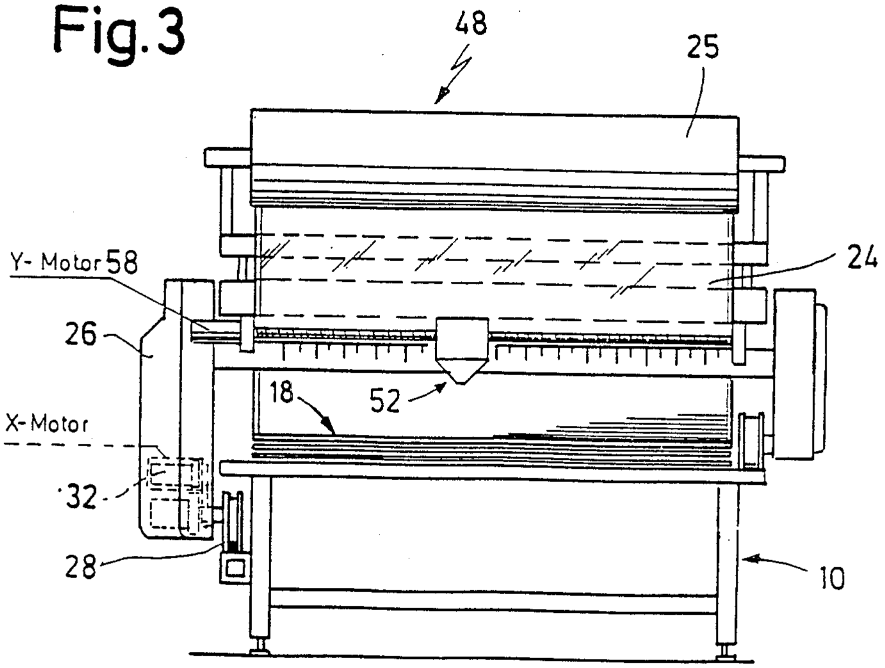
FIG. 3 is a front view of the machine according to FIG. 2, seen in the direction of arrow 22 in FIG. 2.

As shown clearly in FIG. 1 in conjunction with FIGS. 2 and 3, the fabric 25 for the webs 24 to be laid out is disposed on a supply roll 48 which is rotatably held in forked mountings on the upper side of the fabric laying carriage 12. The cloth 25 is laid out on the spreading table 10 in a customary manner starting from a line 20 and cut with the aid of a cutting apparatus 46 when the front end of a web of fabric 24 is reached. A plurality of superimposed webs of fabric 24 hereby form a stack 18. The cloth is moved forward during laying of the individual layers 24 by means of a transport roller 50. If portions of a web 24 which has already been laid out have to be wound back, the roller 50 is then driven in the opposite direction of rotation. A supply loop can hereby be formed with the aid of the compensating roller 51 indicated in the drawing. If necessary, the supply roll 48 can also be driven for the purpose of winding back the fabric 25. The supply roll 48 is, if required, driven by means of a hand wheel 49 (cf. FIG. 1).

The fabric laying carriage 12 comprises a frame 26 which is displaceable in the customary manner along horizontal rails 30 on the spreading table 10 by means of wheels 28. One of the wheels or rather a pair of wheels 28 is hereby driven with the aid of a motor 32. This motor is designated in the drawing as the X-motor since it is assumed in accordance with the present application that the X-direction extends in the longitudinal direction of the spreading table 10 whereas the Y-direction extends transversely, in particular at right angles, to the X-direction and therefore transversely to the webs of fabric 24 spread out on the table 10.

When the webs 24 are being laid out, the fabric laying carriage 12 is driven such that it is moved away from the edge 20. This direction of movement of the fabric laying carriage 12, i.e. to the left in FIG. 2, is indicated by an arrow 22.

A marking light source 52 is located on the rearward side of the fabric laying carriage 12, i.e. rearward in relation to the direction of travel shown by arrow 22. With the aid of this marking light source a defect marking symbol, for example in the shape of a cross 54, may be projected onto the plane of the last web of fabric 24 to be laid out. With the aid of a spindle 56 which is driven by a motor 58 (if required via its own gear unit which is not illustrated) the light source 52 may be driven in the Y-direction transversely to the webs of fabric 24 already laid out. The motor 58 is therefore designated in FIG. 2 as the Y-motor. The light source 52 has a displaceable connection cable 60 connected to a voltage supply source (not illustrated). The displaceable carriage 12 and the spindle 56 form a cross slide arrangement 70 (cf. FIG. 4), with the aid of which the light source 52 may be moved into any desired position over the table 10.

Figure 4:
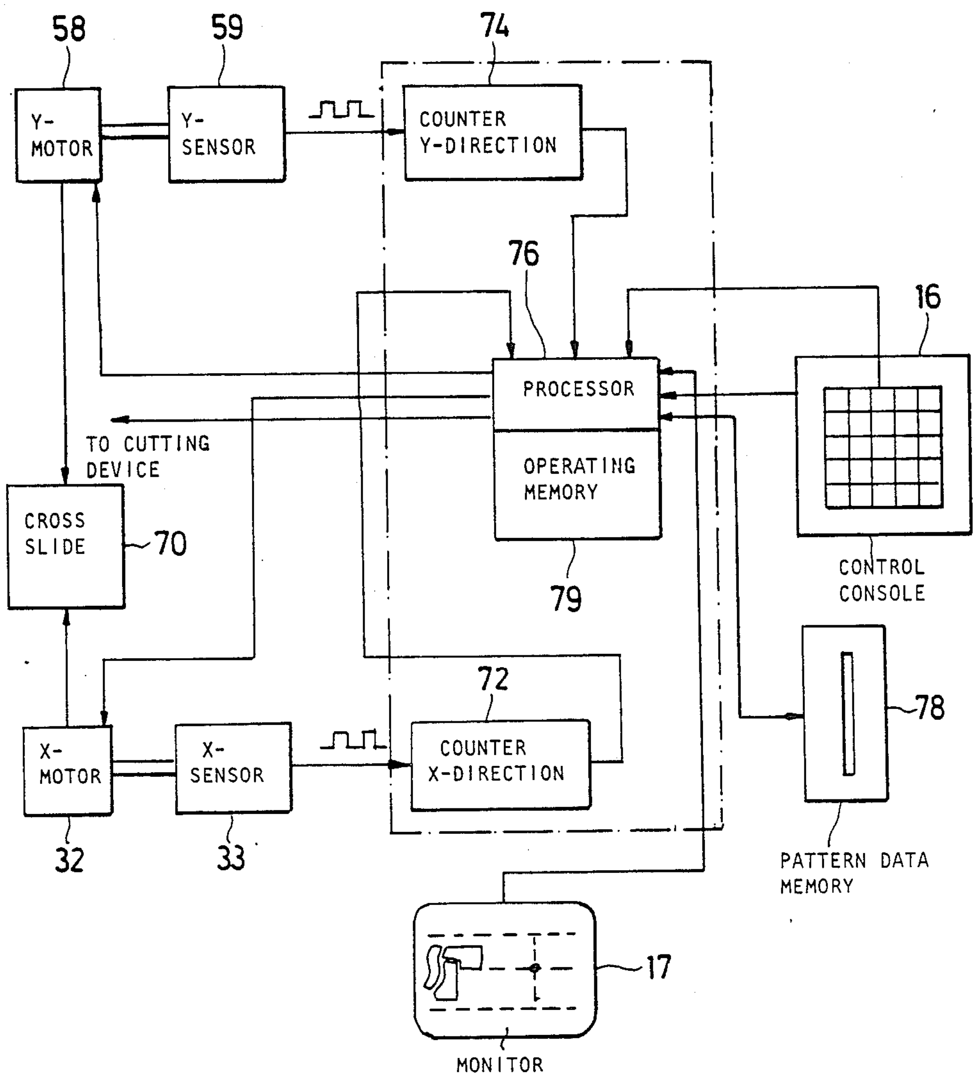
FIG. 4 is a schematic block diagram of the essential electric or electronic elements for a fabric laying machine as shown in FIGS. 1 to 3 for carrying out the inventive method.

As shown in FIG. 4, a sensor is associated with each of the two motors 32, 58 of the cross slide arrangement 70, namely an X-sensor 33 and a Y-sensor 59. The sensors 33, 59 may be customary tacho-alternators which generate a square-wave impulse sequence, each square-wave impulse corresponding to an increment step in the X-direction or the Y-direction, respectively In addition, customary means (not illustrated) are provided for supplying information on the direction of rotation of the motors 32 or 58.

The output signals of the sensors 53, 59 are supplied to a counter 72 or 74, respectively. The counters 72, 74 are forwards/backwards counters, their counting direction corresponding to the direction of rotation of the associated motor 32 or 58, respectively. The counter readings of the counters 72 and 74 are fed to a processor 76 via associated connection lines. Additional inputs to the processor 76 are connected to the outputs from the control console 16 and an external memory 78 which is shown in the embodiment as a magnetic disc memory or floppy disc memory. An operating memory 79 is associated with the processor 76. Outputs from the processor 76 are connected to the two motors 33, 58, the cutting device 52 and the monitor 17. Corresponding arrows for the connecting lines to the control console 16, the memory unit 78 and the monitor 17 indicate that control signals from the processor 76 can also be fed to these periphery devices, as is customary in computer-controlled apparatuses of this type. The various units of the control system shown in FIG. 4 can be assembled and interact in a manner known per se, which is familiar to the person skilled in the art and described, for example, in the German laid-open paper DE-OS No. 32 47 732 mentioned at the outset or rather the U.S. application on which this publication is based, i.e. U.S. Ser. No. 509,972 of June 30, 1983. Other suitable control systems are described in U.S. Pat. Nos. 3,540,830, 4,176,566, 3,803,960 and 3,887,903. Reference is expressly made to the disclosures of these publications in connection with the design of the control system and the individual subunits thereof as well as in connection with the generation of signals. The disclosures of the cited publications are intended to supplement the present application.

When operating a fabric laying machine as shown in FIGS. 1 to 3 with a control system as shown in FIG. 4, each individual fabric layer 24 is laid out on the table 10 or on the layers 24 already laid out, beginning at line 20. Once the desired length of fabric has been laid out or at the end of the stack 18 the fabric is cut and the fabric laying carriage 12 returns to the original starting position at line 20 to begin laying out the the next layer of fabric 24.

If the person operating the machine detects a fault in the material during laying out, he or she will actuate the keys of the control console 16 such that the marking 54 generated by the light source 52 is moved exactly over the fault or over relevant corner points thereof. This is carried out by actuating the motors 32 and 58 accordingly. When the marking 54 is located in the correct position over the material defect, the corresponding coordinate values for the X-coordinates and the Y-coordinates are passed to the processor 76 as a function of the counter readings of the counters 72 and 74 and then to the operating memory. The position of the defect can be displayed on the screen of the monitor 17 on the basis of the coordinate values stored. The screen also displays the relevant area of the pattern using the data stored in the memory unit 78 and the position of the fabric laying carriage 12 which corresponds to the counter reading of the counter 72. By coordinating the position of the material defect with the marker on the screen of the monitor 17, the person operating the machine can establish whether the detected material defect is located in a pattern piece or in the reject material. When the defect is in a reject piece, the fabric will continue to be laid out in the customary manner. When the defect is located in a pattern piece, i.e. in an area of the layer 24 which has just been laid out which would be located in a pattern piece subsequently cut out, then the following steps are taken:

The fabric laying carriage 12 is moved back to the position of the defect and the light source 52 is positioned over this defect. The coordinates for one or more points of the defect are stored. The fabric laying carriage is then moved further back to a cutting line located upstream of the defect in the direction of laying and determined by the computer system. The web of material is cut across its entire width along this cutting line. Subsequently the fabric laying carriage 12 is again displaced forwards in the direction of laying and the web of material is again cut across its entire width directly behind the material defect. The reject strip hereby obtained is removed from the spreading table. The fabric laying carriage 12 is then moved back contrary to the direction of laying and the cloth end resulting from the strip being cut out is laid at a line determined by the computer system. Subsequently, the fabric laying carriage travels forwards again in the direction of laying.

The aforesaid sequence of steps for carrying out the inventive method will now be explained in more detail on the basis of FIGS. 5 and 6.

FIG. 5 is a schematic illustration of the various positions taken up by the fabric laying carriage 12 when the various pattern pieces 34 are to be cut out of the stack 18 in accordance with the marker shown in FIG. 6 and when a material defect, which is located in one of the pattern pieces 34 and must therefore be cut out, is detected during laying out of one of the webs 24 of fabric.

The position of the assumed material defect is indicated in the marker according to FIG. 6 by a shaded area 36.

In this assumed situation, the carriage 12 first travels in the direction of laying, i.e. to the left in accordance with FIG. 5*a*, the supply roll 48 hereby rotates in a counter-clockwise direction and the fabric is laid to the rear, i.e. to the right. The carriage 12 reaches a position B in the longitudinal direction, i.e. in the X-direction, of the table 10 before the person operating the machine detects the material defect 36. The carriage 12 is first stopped by actuating the corresponding keys on the console 16 and then moved back to position C, as shown in FIG. 5*b*. The fabric is hereby rewound, for example, by driving the supply roll 48 in a clockwise direction. Once the carriage 12 has reached position C, which corresponds to the left-hand end, in the X-direction, of the faulty area 36 shown in FIG. 6, the Y-motor 58 is actuated by the person operating the machine due to actuation of the keys on the console 16 such that the marking light source 52 is, for example, moved to the lower left-hand corner of the area 36. The coordinates of this point are stored (when the defect has only small dimensions and it is clear that only one pattern piece 34 is affected by the defect, it is sufficient to position the marking light source 52 once over the material defect). The carriage 12 is then moved back even further to position D to determine, for example, the coordinates of the upper right-hand corner of the area 36. As soon as the size of the faulty area is established on the basis of the two corner points of the area 36, position E will be calculated by the processor 76 as being the optimum cutting line on the basis of the coordinate data of the defect and the marker data. The carriage 12 is then moved to this position E where the web is cut across its entire width with the aid of the cutting device 46. The carriage 12 is illustrated in FIG. 5*c* in the position E. Once the fabric has been cut through the carriage 12 travels back to position C as shown in FIG. 5*d* where the web of fabric is cut through directly at the left-hand end of the faulty area 36. Once the strip of material cut out in this way has been removed from the table 10, the carriage 12 is moved back to a position F calculated on the basis of the marker (FIG. 5*e*) without material being laid out or rewound, i.e. the supply roll 48 is stationary, and then recommences normal laying out of the material in the direction of laying, as illustrated in FIG. 5*f*. In this way, an overlap occurs between positions E and F during laying out. This ensures that even those pattern pieces 34 which begin before the line of cutting E in the direction of laying are completely cut out.

The above description of the operating sequence of the method, based on FIGS. 5 and 6, clearly shows that the inventive method reliably prevents defective pattern pieces, which could later impair production during the course of sewing, being included amongst the pattern pieces cut out of the web stack 18.

The movements of the carriage 12, which are explained in the aforesaid and illustrated in detail in FIG. 5, are also schematically illustrated in FIG. 6, below the marker. The symbols indicate the cutter device with which the web of fabric is separated along the lines E and C.

In the above, it has been assumed that the X-motor and the Y-motor are controlled by actuation of keys on the control console 16. It is, however, also possible to actuate these two motors by means of a joystick. Such a joystick is illustrated in FIG. 1 and designated by the reference numeral 40.

It is further possible to establish material defects present in a web of fabric not during laying out but beforehand at a so-called product inspection machine and to mark these defects by means of metal discs adhered to the fabric. In this case, a corresponding detector means could be provided on the fabric laying machine for detecting the metal discs so that the digital coordinate values of the defects could be automatically ascertained.

What is claimed is:

1. In a method of optimally laying out a defect-containing fabric web, including the steps of storing, in a computer system, data on pattern pieces and their arrangement on the fabric layout; displaying the image of pattern arrangement on a display screen during fabric laying; determining and storing the coordinates of the defect; displaying the image of the defect on the display screen and comparing the position of the defect with the pattern arrangement on the display screen; and, conditioned upon a determination of an intrusive nature of the defect, interrupting a normal fabric-laying operation and laying the fabric anew in an overlapping relationship with a zone of the defect; the improvement comprising the steps of storing information relating to the normally visible areas of the pattern pieces of the finished garment to be made from the pattern pieces; and the step of displaying the image of pattern arrangement including the step of showing visually differently said normally visible areas on each pattern piece from not visible areas thereof for a determination whether or not said defect is of intrusive nature.

2. A method as defined in claim 1, further comprising the step of storing data relating to further processing of said garment subsequent to sewing the pattern pieces; said step of displaying the image pattern including the step of showing said data for a determination whether or not said defect is of intrusive nature.

3. A method as defined in claim 1, further comprising the step of storing additional data defining the type of each defect and said step of displaying the image of the pattern arrangement including the step of making visible said additional data.

4. A method as defined in claim 1, wherein the step of determining and storing the coordinates of the defect includes the step of determining and storing a plurality of coorinate pairs for the defect for characterizing the area spread thereof.

5. A method as defined in claim 4, wherein the step of determining and storing a plurality of coordinate pairs includes the step of determining and storing pairs of coordinates of two diagonally opposite corner points of the defect.

6. In a method of optimally laying out a defect-containing fabric web, including the steps of storing, in a computer system, data on pattern pieces and their arrangement on the fabric layout; displaying the image of pattern arrangement on a display screen during fabric laying; determining and storing the coordinates of the defect; displaying the image of the defect on the display screen and comparing the position of the defect with the pattern arrangement on the display screen; and, conditioned upon a determination of an instrusive nature of the defect, interrupting a normal fabric-laying operation and laying the fabric anew in an overlapping relationship with a zone of the defect; the improvement comprising the step of storing data relating to further processing of said garment subsequent to sewing the pattern pieces; said step of displaying the image pattern including the step of showing said data for a determination whether or not said defect is of instrusive nature.

7. In a method of optimally laying out a defect-containing fabric web, including the steps of storing, in a computer system, data on pattern pieces and their arrangement on the fabric layout; displaying the image of pattern arrangement on a display screen during fabric laying; determining and storing the coordinates of the defect; displaying the image of the defect on the display screen and comparing the position of the defect with the pattern arrangement on the display screen; and, conditioned upon a determination of intrusive nature of the defect, interrupting a normal fabric-laying operation and laying the fabric anew in an overlapping relationship with a zone of the defect; the improvement comprising the step of determining, with said computer system, two optimal cutting lines downstream and upstream of said defect as viewed in the direction of fabric laying; severing the fabric along the entire width thereof at said two cutting lines for obtaining a waste fabric strip containing said defect; and calculating in each instance, with said computer system, a starting location for laying the fabric anew in an overlapping relationship such that all pattern pieces traversed by the cutting line upstream of the defect are laid anew and that the area of overlap is maintained at a small value.

8. A method as defined in claim 7, further comprising the step of storing data relating to further processing of said garment subsequent to sewing the pattern pieces; said step of displaying the image pattern including the step of showing said data for a visual determination whether or not said defect is of intrusive nature.

9. A method as defined in claim 7, further comprising the steps of storing information relating to the normally visible areas of the pattern pieces of the finished garment to be made from the pattern pieces; and the step of displaying the image of pattern arrangement including the step of showing visually differently said normally visible areas on each pattern piece from not visible areas thereof for a determination whether or not said defect is of intrusive nature.

10. A method as defined in claim 9, further comprising the step of storing additional data defining the type of each defect and said step of displaying the image of the pattern arrangement including the step of making visible said additional data.

11. A method as defined in claim 7, wherein the step of determining and storing the coordinates of the defect includes the step of determining and storing a plurality of coordinate pairs for the defect for characterizing the area spread thereof.

12. A method as defined in claim 11, wherein the step of determining and storing a plurality of coordinate pairs includes the step of determining and storing pairs of coordinates of two diagonally opposite corner points of the defect.

* * * * *